United States Patent [19]

Kim et al.

[11] Patent Number: 5,748,688
[45] Date of Patent: May 5, 1998

[54] BIT-PATTERN DETECTOR

[75] Inventors: Su Hwan Kim, Seoul; Seong Ok Bae, Kyungki-Do, both of Rep. of Korea

[73] Assignee: LG Semicon Co., Ltd., Choongcheongbuk-Do, Rep. of Korea

[21] Appl. No.: 691,530

[22] Filed: Aug. 2, 1996

[30] Foreign Application Priority Data

Aug. 4, 1995 [KR] Rep. of Korea ............... 24119/1995

[51] Int. Cl.$^6$ ................................................. H04L 7/00
[52] U.S. Cl. .................. 375/368; 375/342; 364/715.11
[58] Field of Search .............................. 375/368, 342; 370/514, 520; 364/715.11, 715.01; 340/146.2; 371/69.1; 382/216, 227, 154

[56] References Cited

U.S. PATENT DOCUMENTS

| | | | |
|---|---|---|---|
| 4,730,346 | 3/1988 | Jiang | 375/368 |
| 4,734,676 | 3/1988 | Huon et al. | 340/146.2 |
| 4,829,462 | 5/1989 | Freeman et al. | 364/715.11 |
| 5,343,540 | 8/1994 | Mitani | 364/715.11 |
| 5,459,754 | 10/1995 | Newby et al. | 375/368 |
| 5,461,633 | 10/1995 | Kitamura | 371/47.1 |

*Primary Examiner*—Temesghen Ghebretinsae

[57] ABSTRACT

A bit pattern detector for detecting a bit pattern in a parallel bitstream input includes left and right matching units for detecting bits in the bitstream input that match the bit pattern. The left matching unit outputs a plurality of signals to an adder, a multiplexer, and a pattern detector, depending on whether and how many matching bits are detected in the bitstream input. The right matching unit also outputs a signal to the adder. The pattern detector outputs a detection signal depending on the input from the left matching unit and the adder, and also outputs a control signal to the multiplexer. The multiplexer selects and outputs a signal from amongst the signals received thereby from the left matching unit and a size signal corresponding to a size of the bitstream input. The detector also may include a bit pattern register which stores the bit pattern and provides it to the left and right matching units, and a bit number register for storing the signal received from the right matching unit.

4 Claims, 3 Drawing Sheets

BIT-PATTERN DETECTOR

BACKGROUND OF THE INVENTION

1. Field of the Invention

The present invention relates to a bit-pattern detector, and in particularly, to an improved bit-pattern detector which is capable of detecting a specific bit-pattern in a serial binary bit-stream at a high speed.

2. Description of the Conventional Art

As shown in FIG. 1, a conventional bit-pattern detector includes a pattern register 110 for loading n bits of a bit-pattern, an n*1 multiplexer 120 for outputting one bit of the n bits loaded in the pattern register 110, a bit matching unit 130 for outputting a matched signal of "1" when a serial bit-stream is matched with a bit output of the n*1 multiplexer 120 such that the serial bit-stream and the bit output of the n*1 multiplexer 120 are identical, and for outputting a matched signal of "0" when vice versa, a left counter 140 for increasing by "1" a counted value in accordance with the matched signal outputted from the bit matching unit 130, a pattern detector 150 for outputting a detected signal "1" when the counted value of the left counter 140 corresponds to a predetermined length of a pattern, an inverter 160 for inverting the matched signal by the bit matching unit 130, and an OR gate 170 for ORing the output of the inverter 160 and a reset signal (RST) and clearing the left counter 140.

The operation of the conventional bit-pattern detector will now be described in detail.

First, to clear the left counter 140, the reset signal (RST) is applied to the left counter 140 through the OR gate 170. Next, when n bits of a pattern to be detected are loaded in the pattern register 110, the n*1 multiplexer 120 receives the n bits of the pattern, selects each bit in accordance with, the counted value of the left counter 140, and outputs the bit to the bit matching unit 130.

Here, the bit matching unit 130 sequentially matches a serial bit-stream inputted by one bit successively and the bit inputted from the n*1 multiplexer 120, and then when the two values are identical, the bit matching unit 130 outputs a matched signal of "1" and when vice versa, outputs a matched signal of "0".

Accordingly, whenever a matched signal of "1" is outputted from the bit matching unit 130, the left counter 140 increases the counted value by "1", and when the counted value of the left counter 140 corresponds to the length of the bit-pattern to be detected, the pattern detector 150 outputs a detected signal (DTD) of "1" to show that the bit-pattern to be detected has been detected.

Contrarily, when a matched signal of "0" is outputted from the bit matching unit 130, the matched signal is inverted by the inverter 160, and inputted to the left counter 140 through the OR gate 170. Then, the left counter 140 is cleared, and the conventional bit-pattern detector carries out the detecting operation on the bit-stream.

As described above, since the conventional bit-pattern detector matches the bit-stream by one bit sequentially, a bit-pattern starting from an arbitrary position is easily detected, but the detection speed is disadvantageously lowered by the sequential matching operation.

SUMMARY OF THE INVENTION

Accordingly, it is an object of the present invention to provide an improved bit-pattern detector which is capable of checking whether an n bit bit-pattern is included in an m-bit input by only one detection operation, and which has an enhanced detection speed for the bit-pattern by informing the detected position of the next bit in accordance with the detection of the bit-pattern.

It is another object of the present invention to provide a bit-pattern detector which is capable of detecting an n bit bit-pattern present between two m-bit inputs.

To achieve the above object, there is provided a bit-pattern detector according to the present invention which includes a pattern register for loading a bit-pattern to be detected, a left matching unit for matching and detecting the bit-pattern of the pattern register with an inputted parallel bit-stream and in accordance with the result, outputting a detected signal of "0" or "1", a position detected signal and the number of left detected bits, a right matching unit for matching and detecting the bit-pattern from the pattern register in the inputted parallel bit-stream and for outputting the number of the detected bits, a RML (Right Matching Length) register for storing the bit number outputted from the right matching unit, an adder for adding the bit number outputted from the RML register to the left detected bit number from the left matching unit, a pattern detector for outputting a pattern detection signal if the detected signal of the left matching unit is "0", and an output of the adder is equal or greater than the length of the bit-pattern to be detected and for outputting a control signal (CTL) for outputting a new detecting position, and a multiplexer for receiving a size signal of an input data, the position detecting signal and the left detected bit number from the left matching unit, and selecting one of the left detected bit number, the new position detecting data, and the size signal in accordance with the control signal from the pattern detector and outputting it as the new position data.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A bit-pattern detector according to the present invention will now be described in detail with reference to the accompanying drawings.

Figure 1:
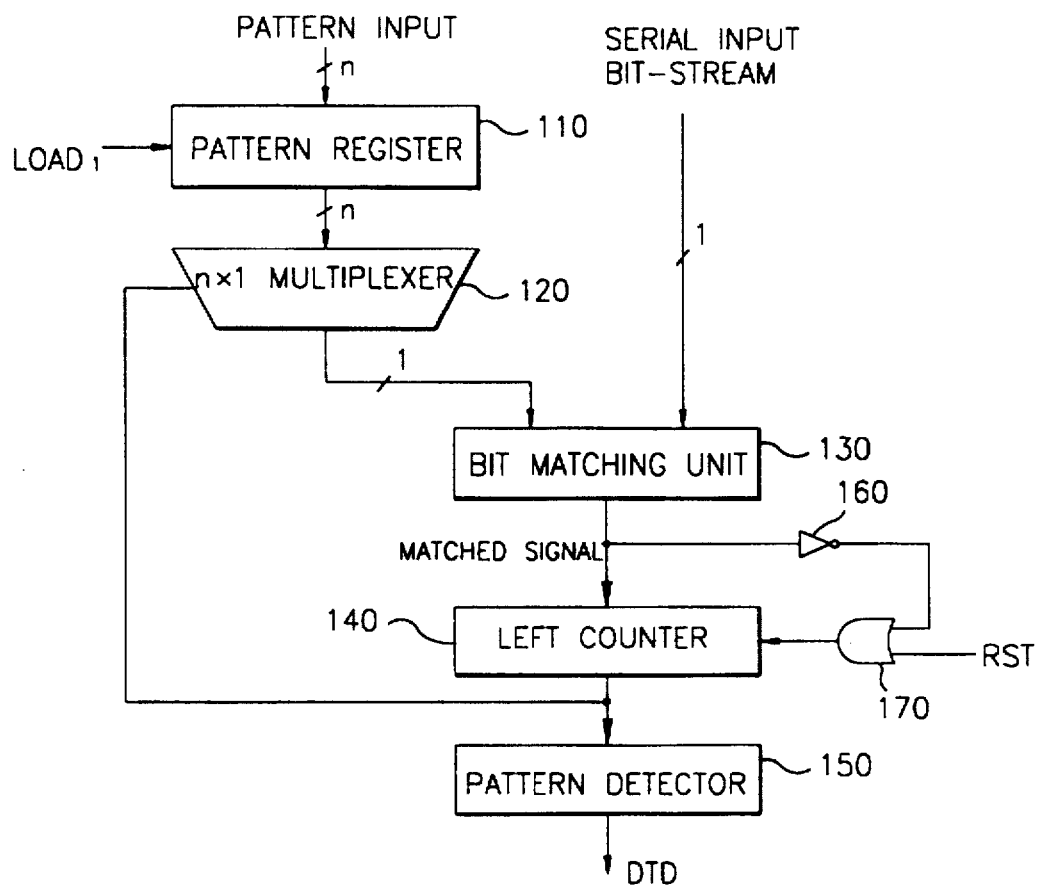
FIG. 1 is a block diagram showing a bit-pattern detector according to the conventional art.
Figure 2:
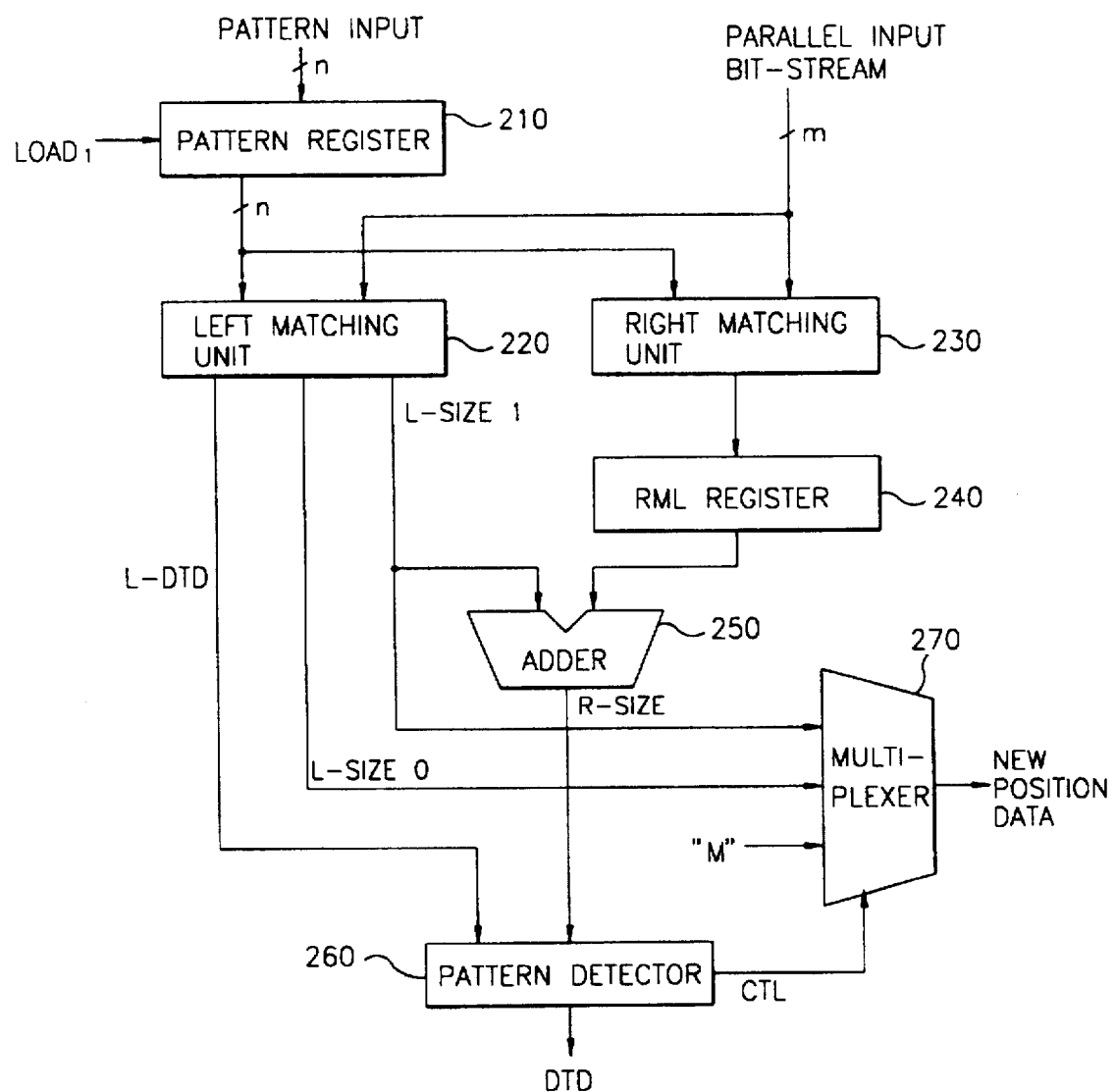
FIG. 2 is a block diagram showing a bit-pattern detector according to the present invention.

As shown in FIG. 2, a bit-pattern detector according to the present invention includes a pattern register 210 for loading a bit-pattern to be detected, a left matching unit 220 for matching the bit-pattern of the pattern register 210 with a present m-bit parallel bit-stream input and outputting a left detected signal (L-DTD) of "1" and a left new position detected signal number (L-size 0) when all bits of the bit-pattern to be detected are in the m-bits, and for outputting a left detected bit number (L-size 1) which is a number of a bit of the bit-pattern detected from the left to the right therein when a bit thereof is detected, a right matching unit 230 for outputting the number of bits detected when detecting the bit pattern of the pattern register 210 and the parallel bit stream inputted thereto in m-bit with respect to the bit positioned in the rightwardmost direction, a RML register 240 for storing the number of the bits outputted from the right matching unit 230, an adder 250 for adding up the number of the bits from the RML register 240 and the number of the left detected bit (L-size 1) included in the present output of the left matching unit 220, a pattern detector 260 for outputting a pattern detection signal and a control signal (CTL) indicating a new detected position when an output (R-size) signal of the adder 250 is equal to or larger than the length of the bit-pattern to be detected when the left detected signal( L-DTD) from the left matching unit 220 is "0", and a multiplexer 270 for receiving a size signal (M) of an input data, the position detecting signal (L-size 0) from the left matching unit 220 and the left detected bit number (L-size 1) signal, and outputting the left detected bits number (L-size 1) when the bit-pattern is positioned between the two inputs, a new position detecting signal (L-size 0) when the bit-pattern is positioned in the present input, and a size signal (M) to new position data when the bit-pattern is not positioned in the present input, in accordance with the control signal (CTL) from the pattern detector 260.

The operation and effect of the bit-pattern detector according to the present invention will now be described in detail.

First, after initializing the value of the RML register 240 to be "0", n bits of a bit-pattern to be detected are loaded in the pattern register 210, and an output from the pattern register 210 is inputted to the left matching unit 220 and the right matching unit 230.

Next, when the m-bit parallel bit-stream is inputted to the left matching unit 220 and the right matching unit 230, the bit-pattern detector according to the present invention starts carrying out a detecting operation.

Therefore, when all n bits of the bit-patterns are present in the present m-bit parallel bit-stream input, the left matching unit 220 outputs a left detected signal (L-DTD) of "1" to the pattern detector 260, and sets the last bit matched to the n-bit bit-pattern among the m-bit as a new position detecting signal, and outputs a new position detected signal (L-size 0) to the multiplexer 270.

Accordingly, since the left detected signal (L-DTD) from the left matching unit 220 is "1", the pattern detector 260 recognizes that the n-bits of the bit-pattern are all positioned in the present m-bit parallel bit-stream input, and outputs a pattern detected signal (DTD) of "1".

Contrarily, when the n-bit bit-pattern is not positioned in the present m-bit parallel bit-stream input, that is, when the n-bit bit-pattern is positioned between the previous m-bit parallel bit-stream input and the present m-bit parallel bit-stream input, the left matching unit 220 outputs a left detected signal (L-DTD) of "0" to the pattern detector 260, and when the bit-pattern is detected from the left to the right the left matching unit 220 outputs the thusly detected bit number, a left detected bit number (L-size 1) to the adder 250 and the multiplexer 270.

Meanwhile, when the n-bit bit-pattern is positioned between the present m-bit parallel bit-stream input and the next m-bit parallel bit-stream input and are detected from the right to the left, the right matching unit 230 outputs the thusly detected bit number which is stored in the RML register 240.

Next, the adder 250 adds up the left detected bit number (L-size 1) outputted from the left matching unit 220 and the bit number outputted from the RML register 240, and then outputs the thusly added-up numbers (R-size) to the pattern detector 260.

Since the left detected signal (L-DTD) outputted from the left matching unit 220 is "0", the pattern detector 260 recognizes that the n-bits of bit-pattern is not in the present m-bit parallel bit-stream input. Therefore, when the output of the adder 250 (R-size) is equal to or greater than the length of the bit-pattern to be detected, the pattern detector 260 recognizes that the bit-pattern is detected, and outputs the pattern detected signal (DTD) of "1".

When the n-bits of bit-pattern is positioned between two successive m-bits of bit-stream inputs, the multiplexer 270 outputs the left detected bit number (L-size 1) which is one of the outputs from the left matching unit 220. And when all the bit-pattern is included in the present inputted bit-stream, the multiplexer 270 outputs the position detecting data signal (L-size 0) from the left matching unit 220, and when the bit-pattern is not detected, the multiplexer 270 outputs the size signal (M) of an input data.

As described above, the bit-pattern detector according to the present invention does not sequentially detect on each bit in the m-bit parallel bit-stream input, but simultaneously performs a detection from the left to the right or from the right to the left, which makes it possible to detect the entire bit-pattern to be detected at a time. Therefore, in comparison with the conventional bit-pattern detector, the speed of the pattern detection becomes effectively faster.

The bit-pattern detector according to the present invention may be utilized in a header detector of an MPEG decoder chip for detecting the header of an MPEG data, and can detect a header representing the starting of each layer in an MPEG bit-stream.

In addition, when searching for the starting point for decoding when starting a decoding operation, or when an error occurs during decoding, the bit-pattern decoder according to the present invention can be used to search for the position of the starting point of a new data to be decoded.

Further, the bit-pattern detector according to the present invention can be adopted to skipping at a high speed the bit-streams corresponding to one picture or many pictures to match the synchronization of audio and video during decoding.

When a header has an n-bit bit-pattern and the header is positioned between two bit-stream inputs (m1, m2) comprising m-bits, the above-described operation will now be explained. Here, m is 32 bits, and n is 24 bits comprising 23 bits of "0" and 1 bit of "1" (m≧n, m,n>0)

The 32 bit parallel bit stream (m1, m2, . . . ) inputted to the right matching unit 230 of the bit-pattern detector is as follows;

m1—1010 1100 0000 1001 0100 0000 0000 0000 m2—0000 0000 0010 0000 1101 0100 0110 1100

First, after the RML register 240 is initialized to be "0", the pattern register 210 is loaded with a layer header having the 24 bits "0000 0000 0000 0000 0000 0001", and then the output of the pattern register 210 is inputted to the left matching unit 220 and the right matching unit 230, respectively.

Next, when the first 32 bit data (m1) of the m-bit parallel bit-stream is inputted to the left matching unit 220 and the right matching unit 230, the bit-pattern detector 200 starts to perform the detection.

Here, since the header is not positioned in the input data (m1) of the first 32 bits and the first left bit is "1", the left detected signal (L-DTD) from the left matching unit 220 becomes "0", and the position detecting data (L-size 0) also becomes "0". And, the left detected bit number (L-size 1) signal representing a bit number belonging to the present input bit pattern among the bit-patterns positioned between the previously inputted bit-stream (m1) and the present inputted bit-stream (m2) becomes "1".

Therefore, the adder 250 adds up the left detected bit number (L-size 1) from the left matching unit 220 of "1" and the initial output of the RML register 240 of "0" and outputs the data (R-size) "1".

Next, when the first input bit-stream data (m1) is matched from the right to the left, since 14 bits are matched, the output of the right matching unit becomes "14", and the value of "14" is stored in the RML register 240.

As described above, if the header is not detected from the first 32-bit input bit-stream (m1), a pattern detected signal (DTD) of "0" is outputted from the pattern detector 260. In addition, the multiplexer 270 outputs a new position data "M=32" in accordance with the control signal (CTL) from the pattern detector 260, and requests the next input of 32-bit data (m2).

Then, when the second 32-bit data (m2) is inputted, since the entire header is not positioned in the second input data (m2), the left matching unit 220 outputs a left detected signal (L-DTD) and a new position detected signal (L-size 0) both of "0", and when the second input data (m2) is matched from the left to the right, since "11" bits are matched, the left detected bit number (L-size 1) from the left matching unit 220 becomes "11".

Then, the adder 250 adds up the "14" stored in the RML register 240 in the previous cycle and the "11" of the left detected bit number (L-size 1) from the left matching unit 220, and outputs the data(R-size) value of "25".

As described in detail above, since the output from the adder 250 of "25" is longer than the "24" bits of the header to be detected, the pattern detector 260 outputs a pattern detected signal (DTD) of "1". And the multiplexor 270 outputs "11" representing the last bit position of the header pattern as a new position data in accordance with the control signal (CTL) from the pattern detector 260.

Next, in the next cycle, the 32bit data including 21 bits except for the left 11 bits of the present input data (m2) is inputted to the left matching unit 220 and the right matching unit 230.

But, when the header is completely included in one 32bit input data, the left matching unit 220 outputs a left detected signal (L-DTD) of "1", and the position detected signal (L-size 0) points to the end of the header, and the left detected bit number (L-size 1) positioned between the previous input and the present input is outputted as "0".

Therefore, the pattern detector 260 outputs a pattern detected signal (DTD) "1", which means the bit-pattern is detected. In addition, the multiplexer 270 selects the position detected signal (L-size 0) from the left matching unit 220 in accordance with the control signal (CTL) from the pattern detector 260, and outputs it as a new position data.

Figure 3:
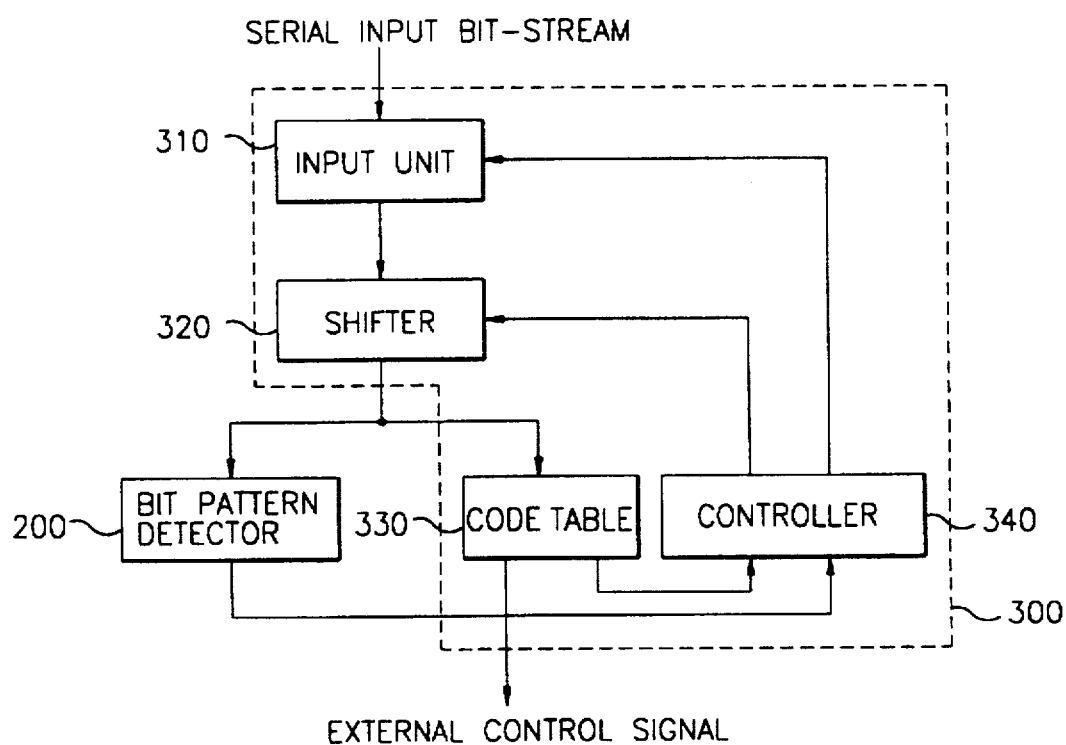
FIG. 3 is an exemplary diagram showing a bit-pattern detector of the present invention adopted in an MPEG-2 video decoder.

FIG. 3 is an exemplary diagram showing a bit-pattern detector of the present invention adopted in an MPEG 2 video decoder, and the MPEG II video decoder has a length-variable decoder 300 and the bit-pattern detector 200.

Here, the variable-length decoder 300 includes an input unit 310 for converting an input serial bit-stream into a parallel bit-stream, a shifter 320 for shifting and outputting the bit-stream arranged in parallel in the input unit 310, a code table 330 for decoding the output of the shifter 320 and outputting the decoded code word and the value of the bit length of the code word, and a controller 340 for controlling the shifter 320 and the input unit 310 in accordance with a signal inputted from the code table 330.

The operation of the MPEG-2 video decoder to which the bit-pattern detector 200 is adopted is as follows;

First, the input unit 310 converts an input serial bit-stream into a parallel bit-stream and outputs them to the shifter 320. The shifter 320 shifts the bit-stream in accordance with the output of the controller 340, and outputs it to the bit-pattern detector 200 and the code table 330.

Then, the code table 330 decodes the output from the shifter 320 and outputs the decoded code word used for controlling an external element(not shown), and outputs the length value of the bits of the code word to the controller 340.

The bit pattern detector receives the output shifter from the shifter 320 of the variable length decoder 300, detects a specific bit pattern and outputs the detected position signal and the detected pattern length to the controller 340.

The controller 340 controls the shifter 320 in accordance with the signals inputted from the bit-pattern detector 200 and the code table 330. Then the shifter 320 shifts the bit-stream inputted from the input unit 310.

As described in detail above, the bit-pattern detector according to the present invention detects a bit-pattern at a high speed in conjunction with a variable-length decoder, and outputs a bit-pattern detected signal (DTD) and a position detected data to the controller 340, to control the shifter 320 for shifting the input bit-stream.

Furthermore, the bit-pattern detector according to the present invention can perform effectively fast forward/fast rewind operations which are instructions implemented in a VCR in the MPEG decoder chip, and is effective for a HDTV systems in which the amount of the data to be detected is considerably increased.

What is claimed is:

1. A detector for detecting a bit pattern in a parallel bitstream input, comprising:

left matching means for detecting bits in the parallel bitstream input matching the bit pattern, and for outputting a left detected signal, a position detected signal, and a left detected bit number in accordance with said detecting;

right matching means for detecting bits in the parallel bitstream input matching the bit pattern and for outputting a right detected bit number in accordance with said detecting;

adding means for adding said left detected bit number and said right detected bit number;

pattern detecting means for outputting a pattern detection signal depending on said left detected signal and an output from said adding means, and for outputting a control signal; and multiplexing means for receiving a size signal corresponding to a length of the bitstream input, said position detected signal, said left detected bit number, and said control signal, and for selecting and outputting one of said size signal, said position detected signal, and said left detected bit number as a new detected position, based on said control signal.

2. The detector of claim 1, comprising a bit pattern register means for storing the bit pattern and passing the bit pattern to said left and right matching means, respectively.

3. The detector of claim 1, comprising a bit number register means for storing said right detected bit number from said right matching means.

4. The detector of claim 1, wherein:

when the bit pattern is entirely positioned in the bitstream input, said left matching means outputs said left detected signal to said pattern detecting means and outputs said position detecting signal to said multiplexing means, and when the bit pattern is not entirely positioned in the bitstream input, said left matching means outputs said left detected bit number to said adding means.

* * * * *